US010994323B2

(12) United States Patent
Ochiai

(10) Patent No.: US 10,994,323 B2
(45) Date of Patent: May 4, 2021

(54) METHOD OF MANUFACTURING WASHER AND WASHER

(71) Applicant: TAIHO KOGYO CO., LTD., Toyota (JP)

(72) Inventor: Hirokazu Ochiai, Toyota (JP)

(73) Assignee: TAIHO KOGYO CO., LTD., Toyota (JP)

( * ) Notice: Subject to any disclaimer, the term of this patent is extended or adjusted under 35 U.S.C. 154(b) by 398 days.

(21) Appl. No.: 15/737,071

(22) PCT Filed: Oct. 21, 2016

(86) PCT No.: PCT/JP2016/081228
§ 371 (c)(1),
(2) Date: Dec. 15, 2017

(87) PCT Pub. No.: WO2017/069229
PCT Pub. Date: Apr. 27, 2017

(65) Prior Publication Data
US 2018/0169736 A1  Jun. 21, 2018

(30) Foreign Application Priority Data
Oct. 22, 2015  (JP) .............................. JP2015-208401

(51) Int. Cl.
| B21D 53/20 | (2006.01) |
| B21D 11/20 | (2006.01) |
| F16B 43/00 | (2006.01) |
| F16C 33/14 | (2006.01) |
| F16C 17/04 | (2006.01) |

(Continued)

(52) U.S. Cl.
CPC .............. *B21D 53/20* (2013.01); *B21D 11/10* (2013.01); *B21D 11/20* (2013.01); *B21D 13/00* (2013.01);
(Continued)

(58) Field of Classification Search
CPC ........ B21D 53/20; B21D 28/06; B21D 13/10; B21D 13/00; B21D 13/08; B21D 53/16;
(Continued)

(56) References Cited

U.S. PATENT DOCUMENTS

| 1,911,384 A | * | 5/1933 | Olson | ..................... F16B 39/24 411/155 |
| 2,270,813 A | * | 1/1942 | Olson | ..................... F16B 39/24 411/165 |

(Continued)

FOREIGN PATENT DOCUMENTS

| DE | 2615920 A1 | 10/1977 |
| GB | 1 585 733 | 3/1981 |

(Continued)

OTHER PUBLICATIONS

International Search Report (PCT/ISA/210) dated Jan. 10, 2017, by the Japanese Patent Office as the International Searching Authority for International Application No. PCT/JP2016/081228.

(Continued)

*Primary Examiner* — Teresa M Ekiert
*Assistant Examiner* — Jared O Brown
(74) *Attorney, Agent, or Firm* — Buchanan Ingersoll & Rooney PC

(57) ABSTRACT

A method of manufacturing a washer capable of improving a material yield is provided. The method includes: a preparation step of preparing a longitudinal member which includes an upper crest portion and a lower crest portion formed on at least one of an upper surface and a lower surface of the longitudinal member, and an upper valley portion and a lower valley portion continuous to the upper crest portion and the rower crest portion in the right-left direction, respectively, the upper valley portion and the lower valley portion provided with projections, respectively; and a deformation step of deforming the longitudinal member such that the upper surface and the lower surface are arcuate as viewed in the direction from the front to the rear.

15 Claims, 9 Drawing Sheets

(51) Int. Cl.
*B21D 11/10* (2006.01)
*B21D 13/00* (2006.01)
*B21D 28/06* (2006.01)

(52) U.S. Cl.
CPC .............. *B21D 28/06* (2013.01); *F16B 43/00* (2013.01); *F16C 17/04* (2013.01); *F16C 33/14* (2013.01)

(58) Field of Classification Search
CPC ........ B21D 53/18; B21D 53/22; B21D 11/10; B21D 11/20; B21D 11/203; F16B 43/00; F16B 43/007; B21F 37/02; B21F 37/04
USPC ............ 470/41, 42, 162, 163; 411/531, 539, 411/147–165, 543, 545; 29/898.041; 384/123, 275, 293, 294, 368, 420
See application file for complete search history.

(56) References Cited

U.S. PATENT DOCUMENTS

| | | | | |
|---|---|---|---|---|
| 2,702,063 | A * | 2/1955 | Poupitch | F16B 39/26 411/134 |
| 3,390,713 | A * | 7/1968 | Gutshall | F16B 39/24 411/154 |
| 6,705,813 | B2 * | 3/2004 | Schwab | F16B 21/20 411/156 |
| 2014/0029884 | A1 * | 1/2014 | Toyama | F16C 33/30 384/490 |

FOREIGN PATENT DOCUMENTS

| | | |
|---|---|---|
| JP | 49-67301 | 6/1974 |
| JP | 51-141767 | 12/1976 |
| JP | 53-91063 | 8/1978 |
| JP | 2001-82457 A | 3/2001 |
| JP | 2015-117817 A | 6/2015 |

OTHER PUBLICATIONS

Supplementary European Search Report issued in corresponding European Patent Application No. 16857542.1, dated May 21, 2019 (7 pages).

* cited by examiner

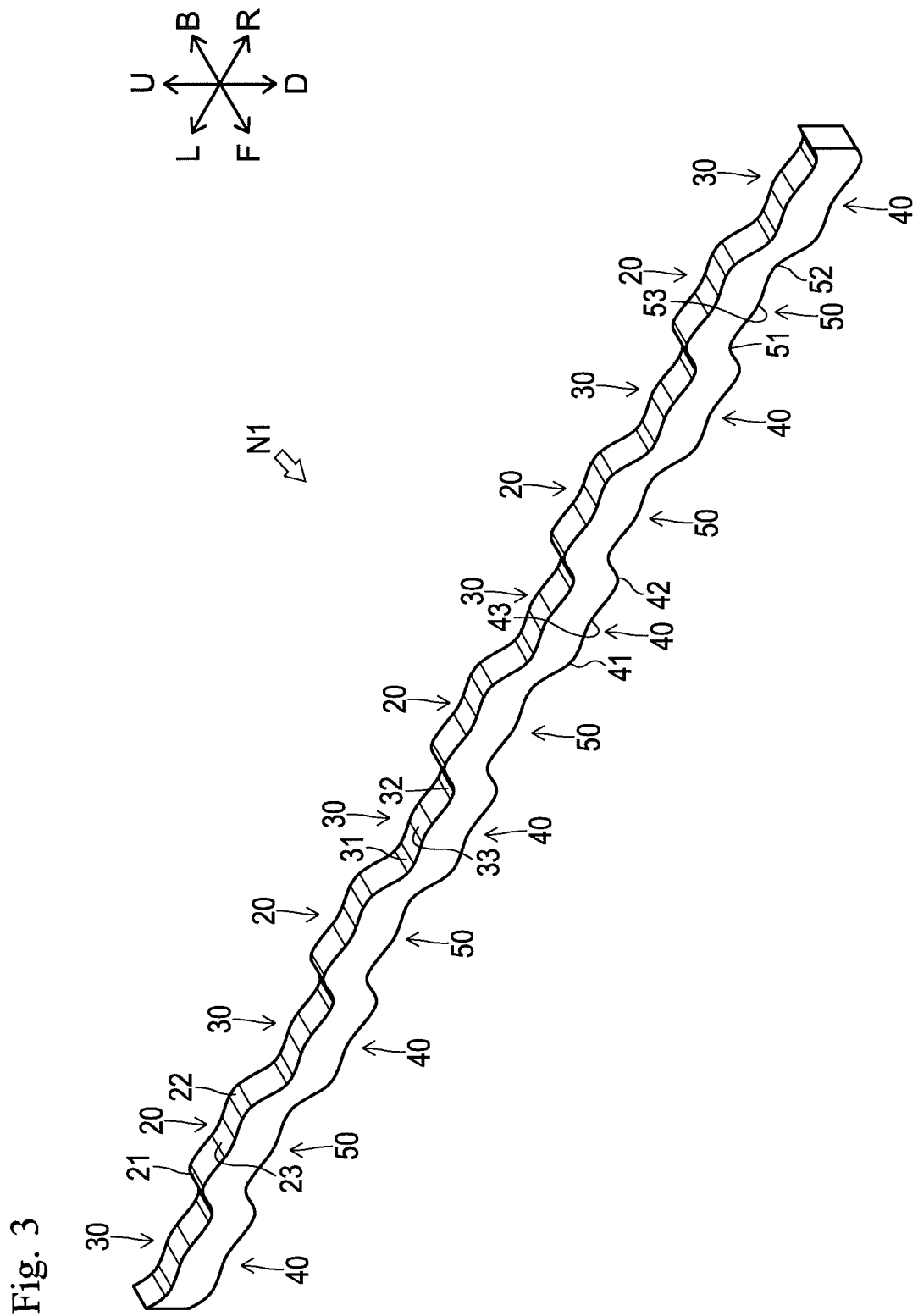

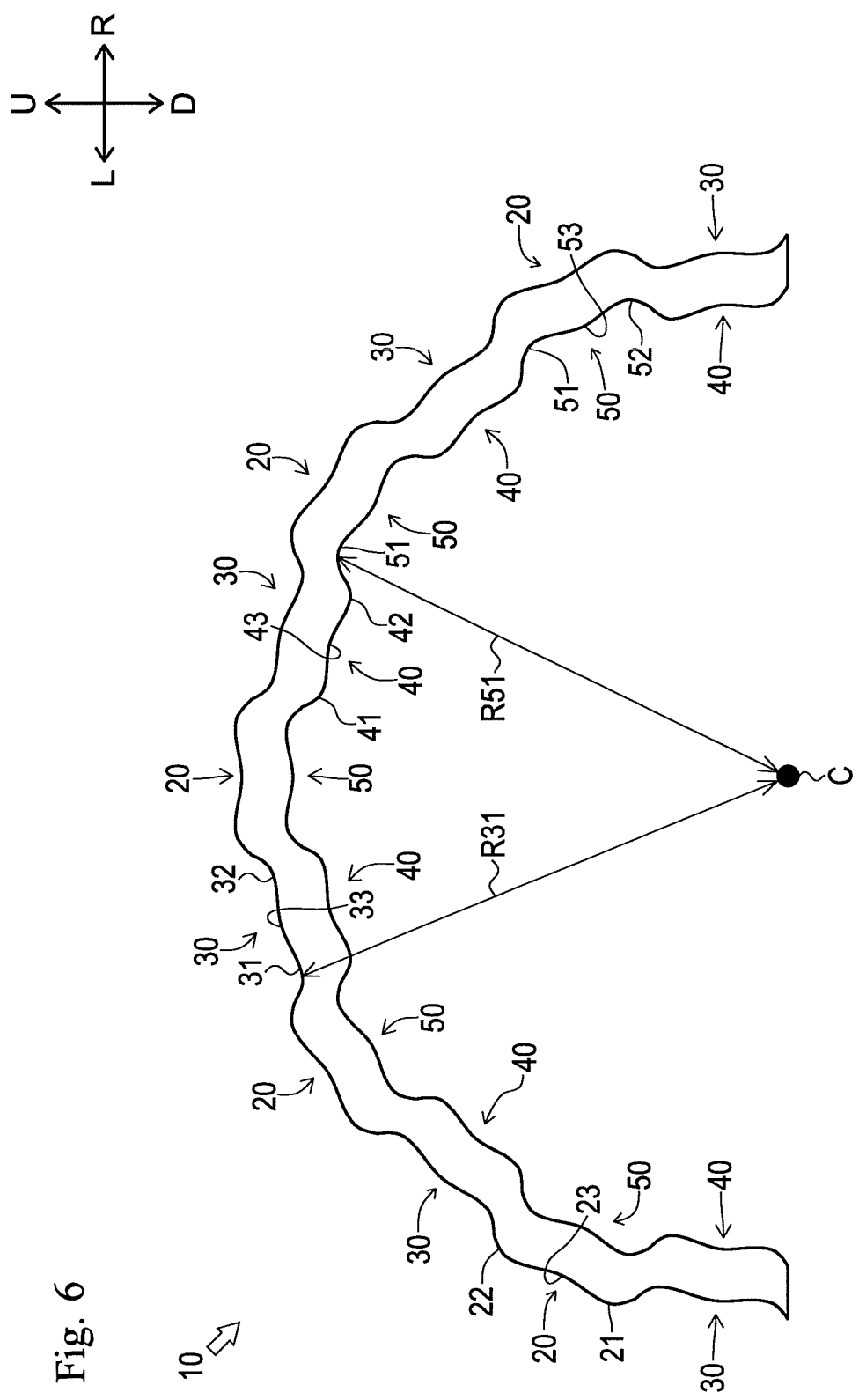

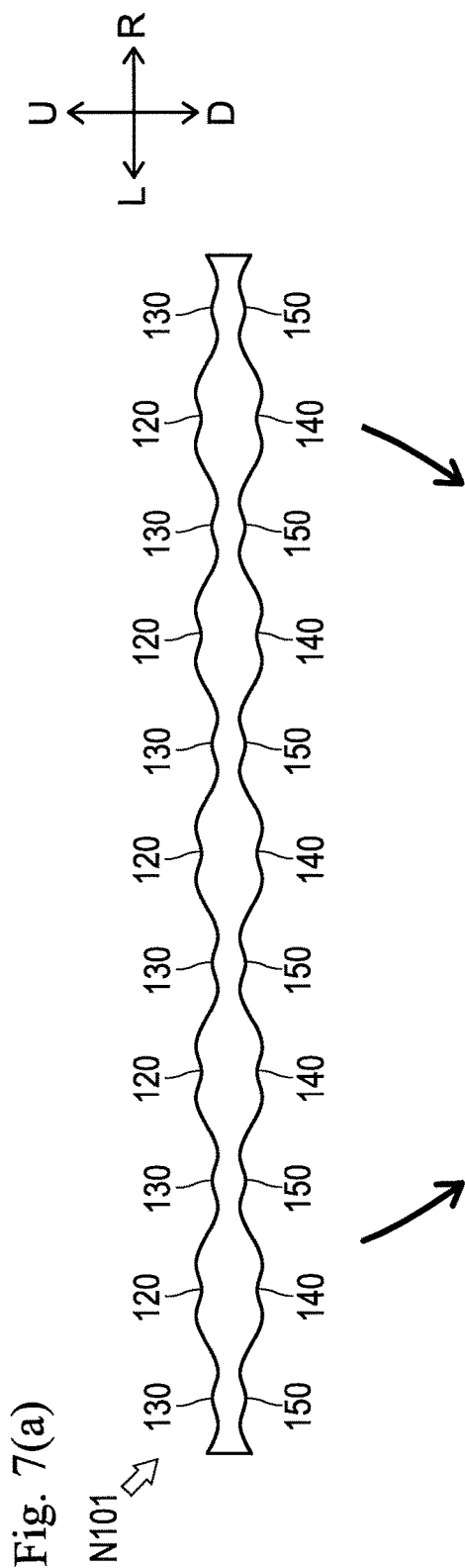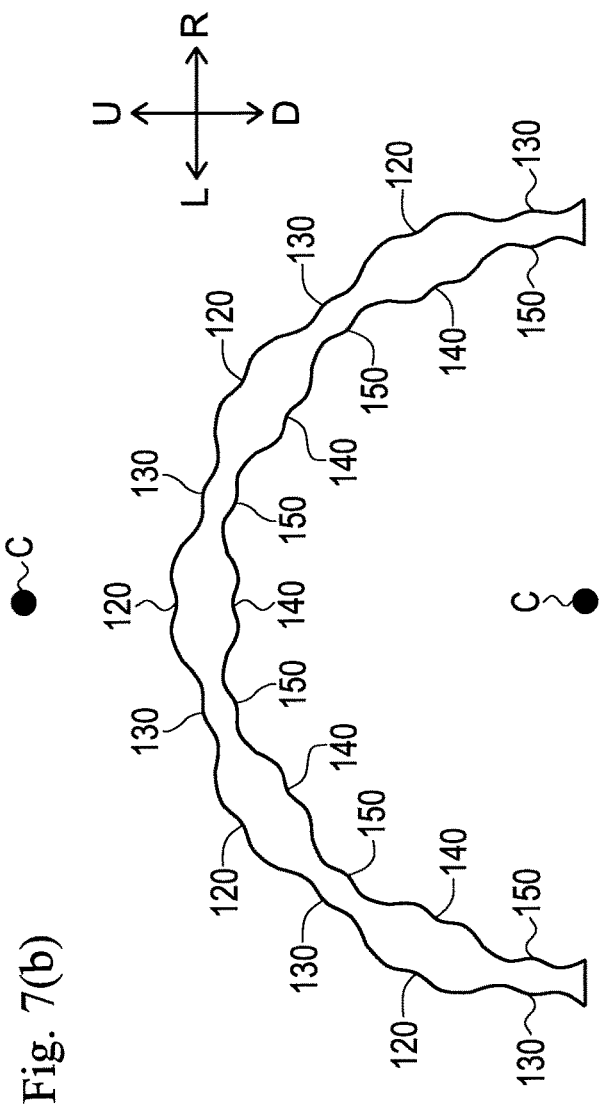
Fig. 7(a)
Fig. 7(b)

METHOD OF MANUFACTURING WASHER AND WASHER

TECHNICAL FIELD

The present invention relates to a method of manufacturing a washer for receiving a load and a technique for a washer.

BACKGROUND ART

Conventionally, a washer for receiving a load is formed by punching a forming material having a substantially plate shape with a forming die. For example, a washer is formed as described in Patent Literature 1.

However, with the technique disclosed in Patent Literature 1, most of the forming material is wasted because an annular shape is punched out in the forming material. In addition, for example, even in a case where semicircular shapes are punched out in a forming material and two semicircular members are joined, most of the forming material is wasted, and it can hardly be said that a material yield can be sufficiently improved (see a scrap S901 illustrated in FIG. 9). As described above, the conventional technique is disadvantageous in that the material yield is poor.

CITATION LIST

Patent Literature

Patent Literature 1: JP 2001-82457 A

SUMMARY OF INVENTION

Technical Problem

The present invention has been made in view of the above circumstances, and an object of the present invention is to provide a method of manufacturing a washer and a washer capable of improving a material yield.

Solution to Problem

The problem to be solved by the present invention is as described above. Next, means for solving the problem will be described.

A method of manufacturing a washer according to the present invention includes: a preparation step of preparing a longitudinal member which includes a crest portion formed on at least one of one side surface and another side surface of the longitudinal member in a lateral direction, and a valley portion continuous to the crest portion in a longitudinal direction, the valley portion provided with a projection; and a deformation step of deforming the longitudinal member such that the one side surface and the other side surface are arcuate as viewed in one direction orthogonal to the lateral direction and to the longitudinal direction.

In the method of manufacturing a washer according to the present invention, the projection of the longitudinal member prepared in the preparation step is formed at a bottom portion of the valley portion.

In the method of manufacturing a washer according to the present invention, the valley portion of the longitudinal member prepared in the preparation step is formed such that a portion of the valley portion adjacent to the projection in the longitudinal direction has an arc shape as viewed in the one direction.

In the method of manufacturing a washer according to the present invention, the projection of the longitudinal member prepared in the preparation step is formed such that a tip portion of the projection has an arc shape as viewed in the one direction.

In the method of manufacturing a washer according to the present invention, the crest portion of the longitudinal member prepared in the preparation step is provided with a recess.

In the method of manufacturing a washer according to the present invention, the recess of the longitudinal member prepared in the preparation step is formed such that a tip portion of the recess has an arc shape as viewed in the one direction.

In the method of manufacturing a washer according to the present invention, a plurality of the crest portions and a plurality of the valley portions are alternately and continuously formed from one end to the other end in the longitudinal direction on at least one of the one side surface and the other side surface of the longitudinal member prepared in the preparation step.

In the method of manufacturing a washer according to the present invention, in the deformation step, the longitudinal member is deformed so that the crest portion and the valley portion are disposed at least on an outer peripheral side.

In the method of manufacturing a washer according to the present invention, the one side surface and the other side surface of the longitudinal member prepared in the preparation step are formed such that a distance along the lateral direction from the one side surface to the other side surface is constant from one end to the other end of the longitudinal member in the longitudinal direction.

In the method of manufacturing a washer according to the present invention, the longitudinal member prepared in the preparation step includes a bimetal material made of a plurality of different metallic materials.

A washer according to the present invention includes a crest portion formed on at least one of an outer peripheral surface and an inner peripheral surface of the washer, and a valley portion continuous to the crest portion in a circumferential direction and provided with a projection.

Advantageous Effects of Invention

The effects of the present invention are as follows.

In the method of manufacturing a washer according to the present invention, a material yield can be improved.

In the method of manufacturing a washer according to the present invention, stress can be effectively dispersed.

In the method of manufacturing a washer according to the present invention, stress can be dispersed in a well-balanced manner in the projection and the portion adjacent to the projection in the longitudinal direction.

In the method of manufacturing a washer according to the present invention, stress can be dispersed in a well-balanced manner in the tip portion of the projection.

In the method of manufacturing a washer according to the present invention, stress can be dispersed in the recess of the crest portion.

In the method of manufacturing a washer according to the present invention, stress can be dispersed in a well-balanced manner in the tip portion of the recess.

In the method of manufacturing a washer according to the present invention, stress can be dispersed in the plurality of valley portions while reduction in sliding area can be suppressed.

In the method of manufacturing a washer according to the present invention, lubricity can be improved.

In the method of manufacturing a washer according to the present invention, a wide range can be covered with a narrow width in the up-down direction.

In the method of manufacturing a washer according to the present invention, peeling of the metallic materials can be suppressed.

In the washer according to the present invention, the material yield can be improved.

BRIEF DESCRIPTION OF DRAWINGS

FIG. 3 is a perspective view illustrating a prepared longitudinal member.

FIG. 6 is a front view illustrating the manufactured washer.

FIG. 7(a) is a view illustrating a state in which a longitudinal member according to a first modification is to be deformed. FIG. 7(b) is a view illustrating the deformed longitudinal member.

DESCRIPTION OF EMBODIMENT

Figure 1:
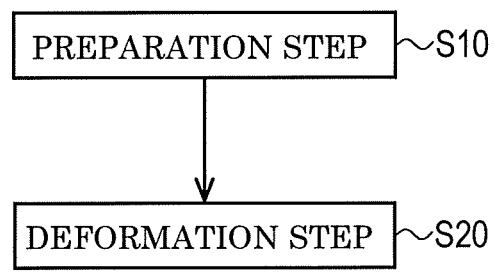
FIG. 1 is a flowchart of a method of manufacturing a washer according to an embodiment of the present invention.

In the following, a description will be given where directions indicated by arrows U, D, F, B, L, and R in the drawings are defined as up, down, front, rear, left, and right directions, respectively.

Hereinafter, a method of manufacturing a washer 10 and the washer 10 according to an embodiment of the present invention will be described.

The washer 10 illustrated in FIG. 6 is a member for appropriately receiving a load. The washer 10 is formed into a semicircular shape (arcuate shape) in front view. The washer 10 according to the present embodiment includes a bimetal material (bimetal material formed by bonding two kinds of metallic materials together) in which different metallic materials are bonded on the front surface and the rear surface. The method of manufacturing the washer 10 is for manufacturing the washer 10 as described above.

Figure 2:
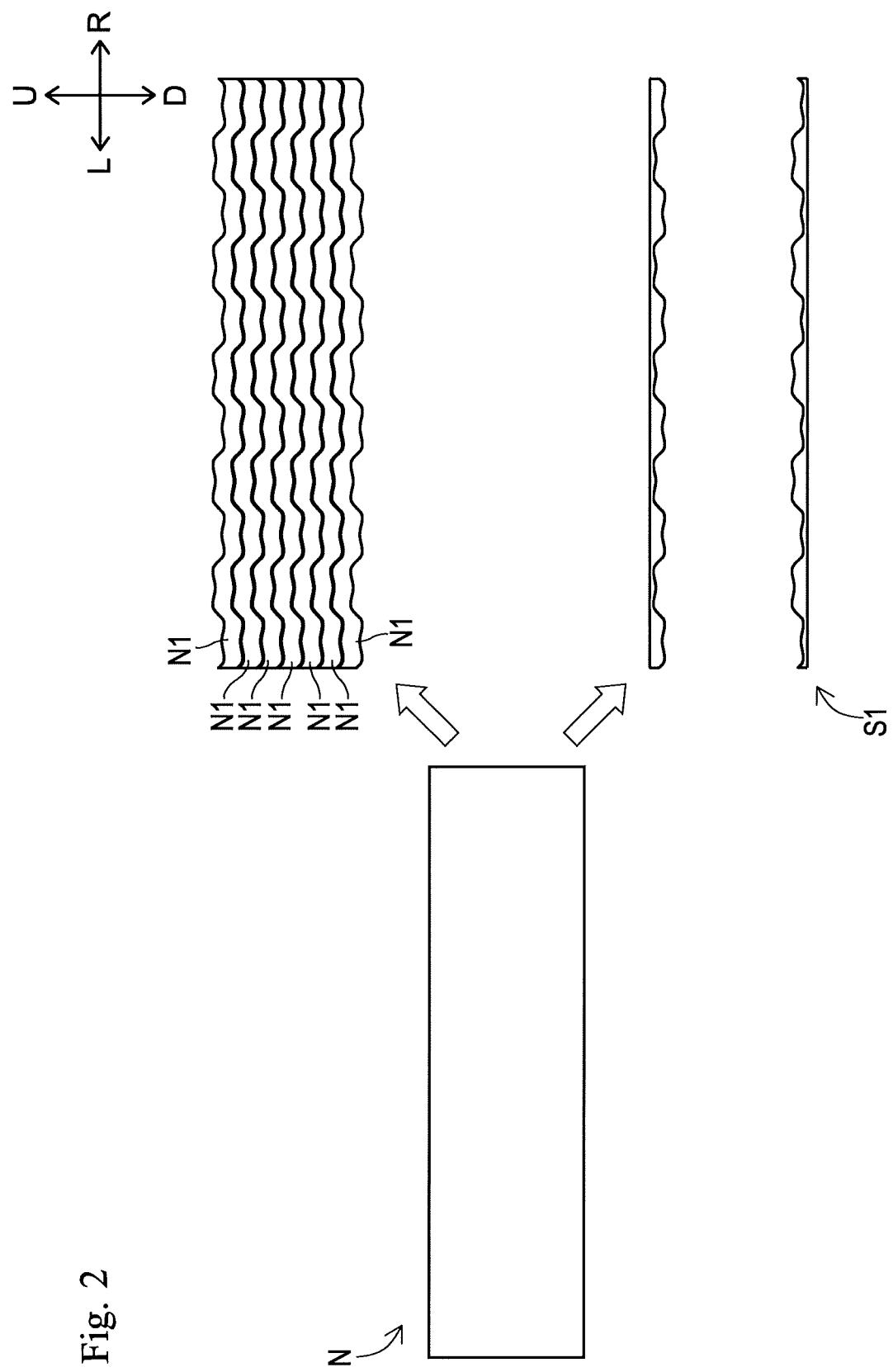
FIG. 2 is a view illustrating a state of punching a plate member.

As illustrated in FIG. 1, first, in the method of manufacturing the washer 10, a preparation step is performed (step S10). In the preparation step, a plate member N illustrated in FIG. 2 is processed to prepare a longitudinal member N1. As illustrated in FIG. 2, the plate member N is a member disposed such that plate faces of the plate member N are directed to the front and the rear and the longitudinal direction of the plate member N matches the right-left direction. The plate member N includes the bimetal material. In the preparation step, the plate member N is subjected to a blanking process, which is a process in which a plate face is punched with a predetermined die. Thus, the plate member N is divided into a plurality (7 in the present embodiment) of longitudinal members N1 and two (upper and lower) scraps S1.

Figure 4A:
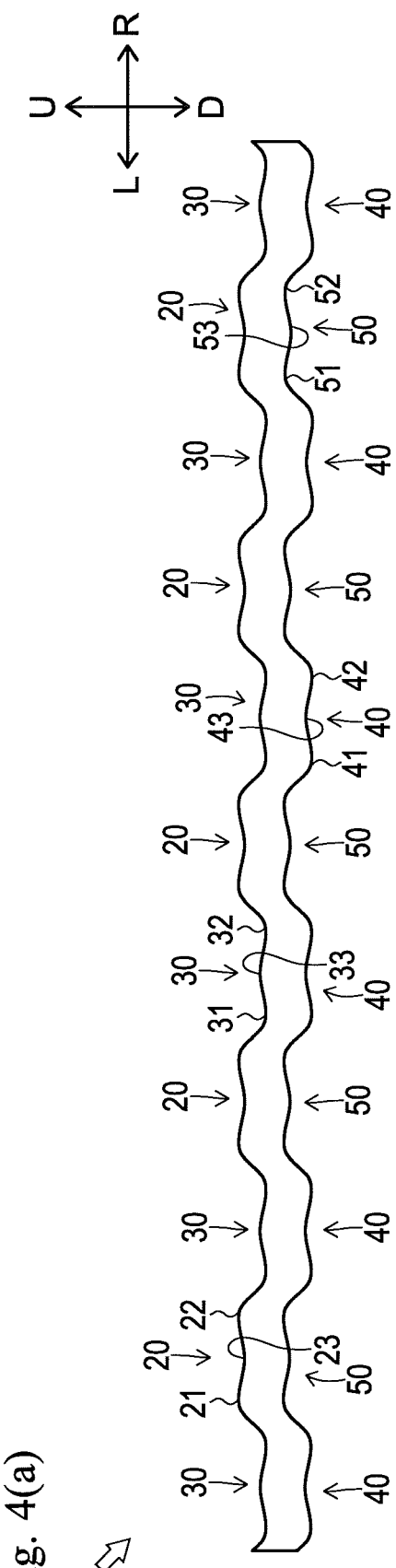
FIG. 4(a) is a front view illustrating the prepared longitudinal member.
Figure 4B:
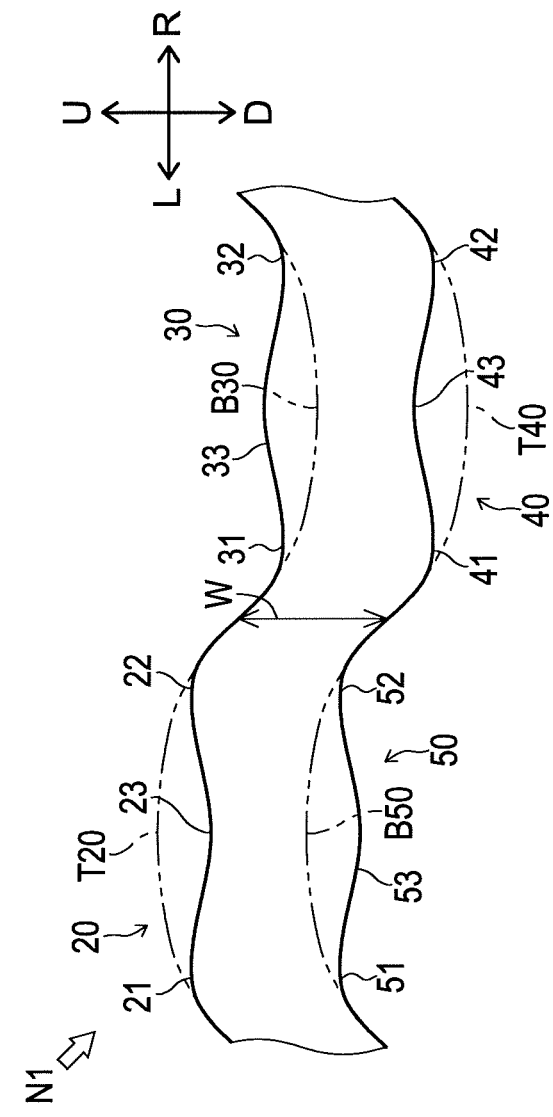
FIG. 4(b) is an enlarged front view of the prepared longitudinal member.

As illustrated in FIGS. 3, 4(a), and 4(b), the longitudinal member N1 prepared in the preparation step is disposed such that the longitudinal direction of the longitudinal member N1 matches the right-left direction. In addition, the longitudinal member N1 is disposed such that the lateral direction of the longitudinal member N1 matches the up-down direction. The longitudinal member N1 includes an upper crest portion 20, an upper valley portion 30, a lower crest portion 40, and a lower valley portion 50.

The upper crest portion 20 is a portion formed so as to protrude upward (in the lateral direction) on the upper surface of the longitudinal member N1. The upper crest portion 20 is formed into an approximately M shape in front view such that the left portion and the right portion of the upper crest portion 20 protrude more than the middle portion in the right-left direction. The upper crest portion 20 is formed to extend from the front end to the rear end (the front surface to the rear surface) of the longitudinal member N1. The plurality of (5 in the present embodiment) upper crest portions 20 is formed in the right-left direction with the upper valley portion 30 to be described later interposed between the upper crest portions 20. Each of the plurality of upper crest portions 20 includes a first crest portion 21, a second crest portion 22, and a recess 23. Note that all the plurality of upper crest portions 20 are configured in the same manner. Therefore, in the following description, the first crest portion 21, the second crest portion 22, and the recess 23 illustrated in an enlarged manner in FIG. 4(b) will be described by way of example.

The first crest portion 21 is formed on the left portion of the upper crest portion 20. The first crest portion 21 is formed into a substantially arc shape in front view projecting upward.

The second crest portion 22 is formed on the right portion of the upper crest portion 20. The second crest portion 22 is formed so as to be bilaterally symmetrical with the first crest portion 21 across the recess 23 to be described later.

The recess 23 is a portion formed to be recessed downward (in the lateral direction) in the upper crest portion 20. The tip portion (lower end portion) of the recess 23 is formed into a substantially arc shape in front view. The recess 23 is formed into a shape obtained by recessing a top portion T20 of the upper crest portion 20 indicated by an alternate long and two short dashes line in FIG. 4(b). Note that the top portion T20 indicated by the alternate long and two short dashes line in FIG. 4(b) virtually illustrates the top portion of the upper crest portion 20 in a case where the recess 23 is not formed. The recess 23 is formed at the central portion in the right-left direction of the upper crest portion 20 and is disposed between the first crest portion 21 and the second crest portion 22. The size in the up-down direction (depth) of the recess 23 is appropriately set so that the tip portion of the recess 23 is disposed at a position higher than (above) the upper valley portion 30 to be described later.

The upper valley portion 30 is a portion formed to be recessed downward (in the lateral direction) on the upper surface of the longitudinal member N1. The upper valley portion 30 is formed into an approximately W shape in front view such that the left portion and the right portion of the upper valley portion 30 are recessed more than the middle portion in the right-left direction. The upper valley portion 30 is formed to extend from the front end to the rear end (the front surface to the rear surface) of the longitudinal member N1. The plurality of (6 in the present embodiment) upper valley portions 30 is formed such that the upper valley portions 30 are continuous to the upper crest portions 20 in the right-left direction. Each of the plurality of upper valley portions 30 includes a first valley portion 31, a second valley portion 32, and a projection 33. Note that all the plurality of upper valley portions 30 are configured in the same manner. Therefore, in the following description, the first valley portion 31, the second valley portion 32, and the projection 33 illustrated in an enlarged manner in FIG. 4(*b*) will be described by way of example.

The first valley portion 31 is formed on the left portion of the upper valley portion 30. The first-valley portion 31 is formed into a substantially arc shape in front view projecting downward.

The second valley portion 32 is formed on the right portion of the upper valley portion 30. The second valley portion 32 is formed so as to be bilaterally symmetrical with the first valley portion 31 across the projection 33 to be described later.

The projection 33 is a portion formed so as to protrude upward (in the lateral direction) in the upper valley portion 30. The tip portion (upper end portion) of the projection 33 is formed into a substantially arc shape in front view. The projection 33 is formed so as to protrude from a bottom portion B30 of the upper valley portion 30 indicated by an alternate long and two short dashes line in FIG. 4(*b*). Note that the bottom portion B30 indicated by the alternate long and two short dashes line in FIG. 4(*b*) virtually illustrates the bottom portion of the upper valley portion 30 in a case where the projection 33 is not formed. The projection 33 is formed at the central portion in the right-left direction of the upper valley portion 30 and is disposed between the first valley portion 31 and the second valley portion 32. The size in the up-down direction (height) of the projection 33 is appropriately set so that the tip portion of the projection 33 is disposed at a position lower than (below) the upper crest portion 20. The projection 33 described above divides a depression (a portion projecting downward) into right and left portions in the upper valley portion 30.

The upper crest portions 20 and the upper valley portions 30 as configured above are alternately and continuously formed from the left end to the right end on the upper surface of the longitudinal member N1.

The lower crest portion 40 is a portion formed so as to protrude downward (in the lateral direction) on the lower surface of the longitudinal member N1. The lower crest portion 40 is formed into an approximately W shape in front view such that the left portion and the right portion of the lower crest portion 40 protrude more than the middle portion in the right-left direction. The lower crest portion 40 is formed to extend from the front end to the rear end (the front surface to the rear surface) of the longitudinal member N1. The plurality of (6 in the present embodiment) lower crest portions 40 is formed in the right-left direction with the lower valley portion 50 to be described later interposed between the lower crest portions 40. Each of the plurality of lower crest portions 40 includes a first crest portion 41, a second crest portion 42, and a recess 43. Note that all the plurality of lower crest portions 40 are configured in the same manner. Therefore, in the following description, the first crest portion 41, the second crest portion 42, and the recess 43 illustrated in an enlarged manner in FIG. 4(*b*) will be described by way of example.

The first crest portion 41 is formed on the left portion of the lower crest portion 40. The first crest portion 41 is formed into a substantially arc shape in front view projecting downward. The first crest portion 41 is formed such that the size in the up-down direction (height) of the first crest portion 41 is substantially identical to the size in the up-down direction (depth) of the first valley portion 31 of the upper valley portion 30. In addition, the first crest portion 41 is formed such that the size in the right-left direction of the first crest portion 41 is substantially identical to the size in the right-left direction of the first valley portion 31 of the upper valley portion 30.

The second crest portion 42 is formed on the right portion of the lower crest portion 40. The second crest portion 42 is formed so as to be bilaterally symmetrical with the first crest portion 41 across the recess 43 to be described later.

The recess 43 is a portion formed to be recessed upward (in the lateral direction) in the lower crest portion 40. The tip portion (upper end portion) of the recess 43 is formed into a substantially arc shape in front view. The recess 43 is formed into a shape obtained by recessing a top portion T40 of the lower crest portion 40 indicated by an alternate long and two short dashes line in FIG. 4(*b*). Note that the top portion T40 indicated by the alternate long and two short dashes line in FIG. 4(*b*) virtually illustrates the top portion of the lower crest portion 40 in a case where the recess 43 is not formed. The recess 43 is formed at the central portion in the right-left direction of the lower crest portion 40 and is disposed between the first crest portion 41 and the second crest portion 42. The recess 43 is formed such that the size in the up-down direction (depth) of the recess 43 is substantially identical to the size in the up-down direction (height) of the projection 33 of the upper valley portion 30. In addition, the recess 43 is formed such that the size in the right-left direction of the recess 43 is substantially identical to the size in the right-left direction of the projection 33 of the upper valley portion 30.

The lower crest portion 40 as configured above is disposed below the upper valley portion 30. That is, the lower crest portion 40 is disposed at a position shifted in the right-left direction with respect to the upper crest portion 20.

The lower valley portion 50 is a portion formed to be recessed upward (in the lateral direction) on the lower surface of the longitudinal member N1. The lower valley portion 50 is formed into an approximately M shape in front view such that the left portion and the right portion of the lower valley portion 50 are recessed more than the middle portion in the right-left direction. The lower valley portion 50 is formed to extend from the front end to the rear end (the front surface to the rear surface) of the longitudinal member N1. The plurality of (5 in the present embodiment) lower valley portions 50 is formed such that the lower valley portions 50 are continuous to the lower crest portions 40 in the right-left direction. Each of the plurality of lower valley portions 50 includes a first valley portion 51, a second valley portion 52, and a projection 53. Note that all the plurality of lower valley portions 50 are configured in the same manner. Therefore, in the following description, the first valley portion 51, the second valley portion 52, and the projection 53 illustrated in an enlarged manner in FIG. 4(*b*) will be described by way of example.

The first valley portion 51 is formed on the left portion of the lower valley portion 50. The first valley portion 51 is formed into a substantially arc shape in front view projecting upward. The first valley portion 51 is formed such that the size in the up-down direction (depth) of the first valley portion 51 is substantially identical to the size in the up-down direction (height) of the first crest portion 21 of the upper crest portion 20. In addition, the first valley portion 51 is formed such that the size in the right-left direction of the first valley portion 51 is substantially identical to the size in the right-left direction of the first crest portion 21 of the upper crest portion 20.

The second valley portion 52 is formed on the right portion of the lower valley portion 50. The second valley portion 52 is formed so as to be bilaterally symmetrical with the first valley portion 51 across the projection 53 to be described later.

The projection 53 is a portion formed so as to protrude downward (in the lateral direction) in the lower valley portion 50. The tip portion (lower end portion) of the projection 53 is formed into a substantially arc shape in front view. The projection 53 is formed so as to protrude from a bottom portion B50 of the lower valley portion 50 indicated by an alternate long and two short dashes line in FIG. 4(b). Note that the bottom portion B50 indicated by the alternate long and two short dashes line in FIG. 4(b) virtually illustrates the bottom portion of the lower valley portion 50 in a case where the projection 53 is not formed. The projection 53 is formed at the central portion in the right-left direction of the lower valley portion 50 and is disposed between the first valley portion 51 and the second valley portion 52. The projection 53 is formed such that the size in the up-down direction (height) of the projection 53 is substantially identical to the size in the up-down direction (depth) of the recess 23 of the upper crest portion 20. In addition, the projection 53 is formed such that the size in the right-left direction of the projection 53 is substantially identical to the size in the right-left direction of the recess 23 of the upper crest portion 20. The projection 53 described above divides a depression (a portion projecting upward) into right and left portions in the lower valley portion 50.

The lower valley portion 50 as configured above is disposed below the upper crest portion 20. That is, the lower valley portion 50 is disposed at a position shifted in the right-left direction with respect to the upper valley portion 30. In addition, the lower crest portions 40 and the lower valley portions 50 are alternately and continuously formed from the left end to the right end on the lower surface of the longitudinal member N1.

The lower crest portion 40 and the upper valley portion 30 as described above are disposed so as to be aligned with each other in the right-left direction. In addition, the lower valley portion 50 and the upper crest portion 20 are disposed so as to be aligned with each other in the right-left direction. Thus, the upper surface and the lower surface of the longitudinal member N1 are formed to have substantially identical shapes. That is, the longitudinal member N1 is formed such that a width W in the up-down direction (distance from the upper surface to the lower surface along the up-down direction) is constant in the entirety of the longitudinal member N1 in the right-left direction.

Figure 5A:
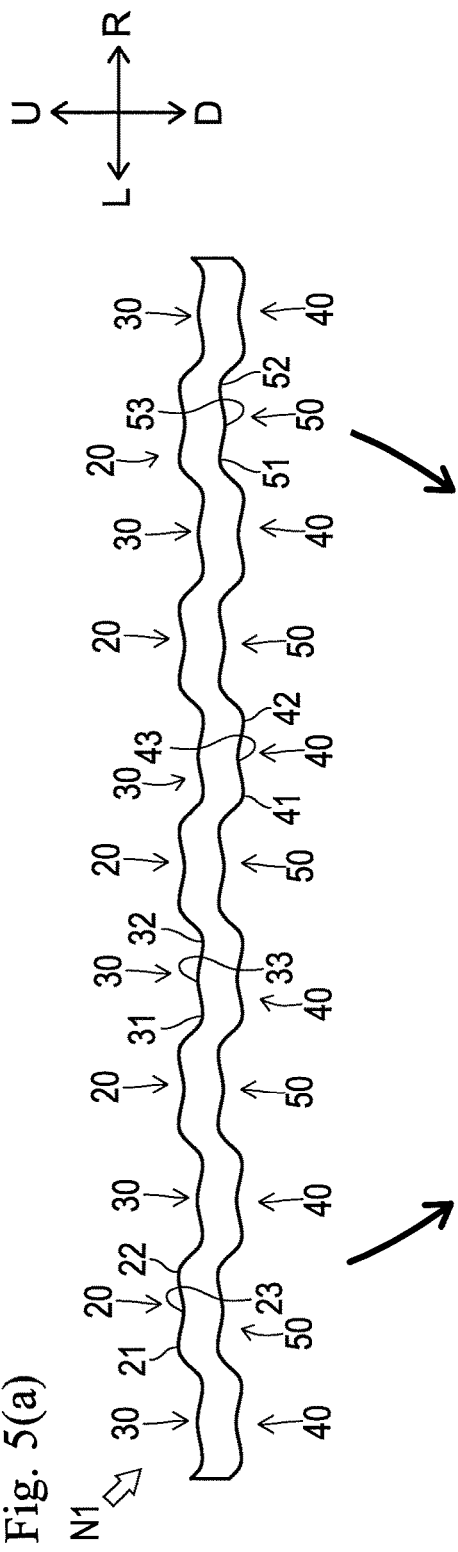
FIG. 5(a) is a view illustrating a state in which the longitudinal member is to be deformed.
Figure 5B:
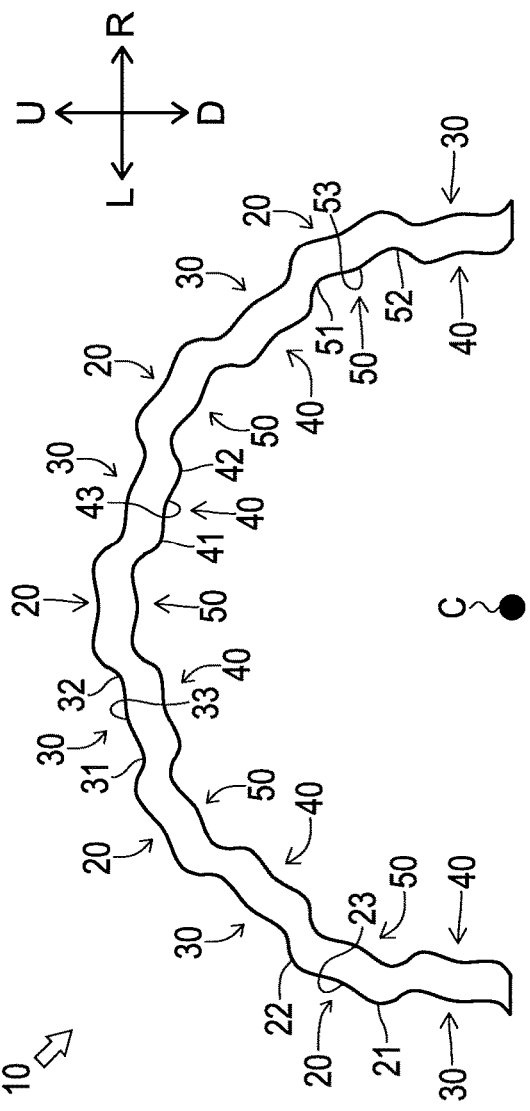
FIG. 5(b) is a view illustrating the deformed longitudinal member.

As illustrated in FIG. 1, after the preparation step is performed, a deformation step is performed (step S20) in the method of manufacturing the washer 10. The deformation step is a step of bending and deforming the longitudinal member N1. In the deformation step, the longitudinal member N1 is restrained by a predetermined jig. Then, as illustrated in FIGS. 5(a) and 5(b), the right portion and the left portion of the longitudinal member N1 are bent to the lower side (toward point C disposed below the longitudinal member N1). Thus, the longitudinal member N1 is plastically deformed into a semicircular shape in front view with point C as the center. Thus, the longitudinal member N1 is formed into the washer 10. On the outer peripheral surface of the washer 10, the upper crest portions 20 and the upper valley portions 30 are disposed. In addition, on the inner peripheral surface of the washer 10, the lower crest portions 40 and the lower valley portions 50 are disposed.

Therefore, when the deformation step described above is performed, the upper surface of the longitudinal member N1 (the outer peripheral surface of the washer 10) is elongated in the circumferential direction of the washer 10 as illustrated in FIGS. 5(b) and 6. At that time, stress is likely to act on the upper valley portions 30 on the upper surface of the longitudinal member N1. As described above, in the upper valley portion 30 according to the present embodiment, the depression is divided into the right and left portions by the projection 33. In the upper valley portion 30, stress is likely to act on left and right depressions (the first valley portion 31 and the second valley portion 32) described above.

As described, on the upper surface of the longitudinal member N1, stress acting on the longitudinal member N1 in the deformation step can be dispersed in the left and right depressions (the first valley portions 31 and the second valley portions 32). Therefore, it is possible to disperse concentrated stress on the washer 10 so as to facilitate deformation, and to reduce damage due to the deformation (internal damage or peeling caused by simultaneously occurring elongation and compression).

As described above, the first valley portion 31 and the second valley portion 32 of the upper valley portion 30 are formed so as to be bilaterally symmetrical. Therefore, stress can be dispersed in a well-balanced manner in the first valley portion 31 and the second valley portion 32.

In addition, the upper crest portion 20 according to the present embodiment includes the recess 23 (depression). Therefore, stress is likely to act also on the recess 23 of the upper crest portion 20 on the upper surface of the longitudinal member N1. Thus, on the upper surface of the longitudinal member N1, stress acting on the longitudinal member N1 in the deformation step can be dispersed in three portions, that is, the recess 23, the first valley portion 31, and the second valley portion 32. Therefore, it is possible to disperse stress on the washer 10 so as to facilitate deformation, and to reduce damage due to the deformation.

In addition, when the deformation step is performed, the lower surface of the longitudinal member N1 (the inner peripheral surface of the washer 10) is compressed in the circumferential direction of the washer 10. At that time, stress is likely to act on the lower valley portions 50 on the lower surface of the longitudinal member N1. As described above, in the lower valley portion 50 according to the present embodiment, the depression is divided into the right and left portions by the projection 53. In the lower valley portion 50, stress is likely to act on the left and right depressions (the first valley portion 51 and the second valley portion 52) described above.

As described, on the lower surface of the longitudinal member N1, stress acting on the longitudinal member N1 in the deformation step can be dispersed in the left and right depressions (the first valley portions 51 and the second valley portions 52). Thus, it is possible to disperse stress on the washer 10 so as to facilitate deformation, and to reduce damage due to the deformation.

As described above, the first valley portion 51 and the second valley portion 52 of the lower valley portion 50 are formed so as to be bilaterally symmetrical. Therefore, stress can be dispersed in a well-balanced manner in the first valley portion 51 and the second valley portion 52.

In addition, the lower crest portion 40 according to the present embodiment includes the recess 43 (depression). Therefore, stress is likely to act also on the recess 43 of the lower crest portion 40 on the lower surface of the longitudinal member N1. Thus, on the lower surface of the longitudinal member N1, stress acting on the longitudinal member N1 in the deformation step can be dispersed in three portions, that is, the recess 43, the first valley portion 51, and the second valley portion 52. Therefore, it is possible to disperse stress on the washer 10 so as to facilitate deformation, and to reduce damage due to the deformation.

In addition, the tip portions of the recesses 23, 43, the first valley portions 31, 51, the second valley portions 32, 52, and the tip portions of the projections 33, 53 according to the present embodiment are formed into a substantially arc shape (a shape without a sharp portion) in front view. Therefore, stress can be dispersed in a well-balanced manner in the tip portions of the recesses 23, 43, the first valley portions 31, 51, the second valley portions 32, 52, and the tip portions of the projections 33, 53.

In addition, since the depressions (the recesses 43, the first valley portions 51, and the second valley portions 52) are formed in the lower surface of the longitudinal member N1, the longitudinal member N1 can be deformed such that the depressions are filled in the deformation step (upon compression). That is, since the depressions are formed on the surface disposed on the outer peripheral side in the deformation step, a relief margin in the deformation step (upon compression) can be secured. Therefore, in the deformation step, the lower surface of the longitudinal member N1 can be deformed smoothly. Therefore, since it is possible to suppress swelling of the front surface and the rear surface of the washer 10, the quality of the washer 10 can be improved.

Thus, manufacture of the washer 10 is completed.

One semicircular washer 10 manufactured as described above may be abutted against circumferential end portions of another semicircular washer 10, and used. In this case, the one semicircular washer 10 is joined to the other semicircular washer 10 by appropriate means such as laser welding. The joined washers 10 are formed into an annular shape and are provided in an appropriate member (for example, a housing for supporting a shaft member). In this state, the washers 10 can receive a load (for example, a load in the axial direction from the shaft member). In addition, the washers 10 can slide on the shaft member. In addition, lubricant is fed from a predetermined lubricant passage to the washers 10. The lubricant is held in the recesses 23, 43, the first valley portions 31, 51, and the second valley portions 32, 52.

Thus, the recesses 23, 43, and the like can function as oil reservoirs. Therefore, lubricity can be improved. In particular, a large quantity of lubricant can be held in the recesses 23, the first valley portions 31, and the second valley portions 32 which are largely opened (widened in the deformation step) on the outer peripheral surface. Therefore, lubricity can be effectively improved.

Figure 9:
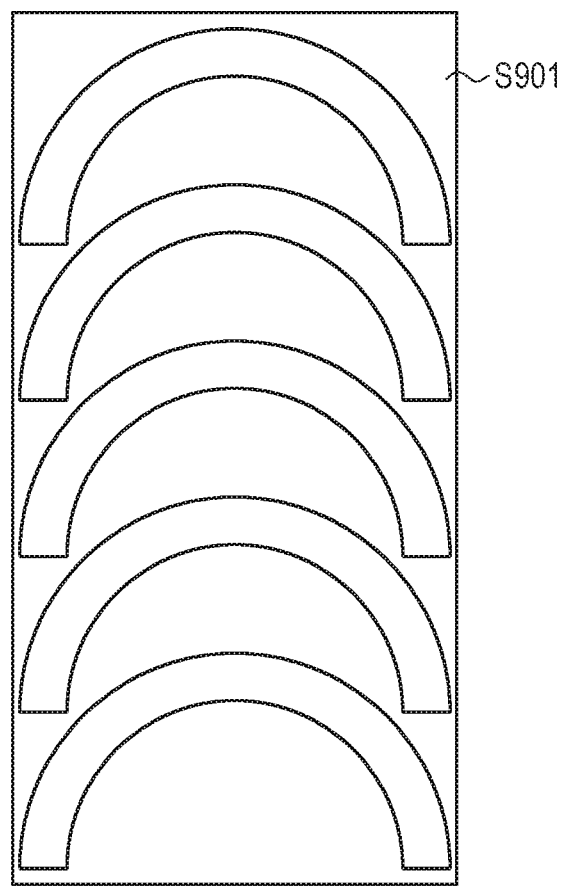
FIG. 9 is a view illustrating a scrap which is a punched forming material.

In the method of manufacturing the washer 10 according to the present embodiment, the longitudinal member N1 is bent into a semicircular shape in front view in the deformation step (it is not necessary to prepare a member having a semicircular shape in front view or an arcuate shape in front view in the preparation step). Therefore, it is possible to punch the plate member N substantially linearly in the preparation step. In addition, as illustrated in FIG. 2, in the case of obtaining a plurality of longitudinal members N1 from one plate member N, the one plate member N can be punched in a state where the plurality of longitudinal members N1 are disposed in the up-down direction without clearance between the longitudinal members N1. Therefore, it is possible to punch the plate member N without waste, and to improve the material yield (see the scrap S1 illustrated in FIG. 2 and the scrap S901 illustrated in FIG. 9).

In addition, in the present embodiment, the upper surface and the lower surface of the longitudinal member N1 are formed to have substantially identical shapes. Therefore, in the case of obtaining a plurality of longitudinal members N1 from one plate member N, it is possible to punch the plate member N in a state where the positions of the left ends and the right ends of the plurality of longitudinal members N1 are aligned. Therefore, it is possible to punch the plate member N without scraping the left end portion and the right end portion of the plate member N. Thus, the material yield can be effectively improved.

As described above, the first valley portion 31 and the second valley portion 32 of the upper valley portion 30 are most likely to be deformed on the upper surface of the longitudinal member N1 illustrated in FIGS. 5(*b*) and 6. That is, in the deformation step, not the upper crest portion 20 but vicinities of the bottom portions of the first valley portion 31 and the second valley portion 32 are mainly deformed (elongated). When the above portions (the vicinities of the bottom portions of the first valley portion 31 and the second valley portion 32) are focused on, the radius of curvature of deformation in the deformation step is the radius to the bottom portion of the first valley portion 31 or the second valley portion 32 (distance along the radial direction from point C to the bottom portion of the first valley portion 31 or the second valley portion 32, see a radius R31 illustrated in FIG. 6). That is, the radius of curvature of the deformation is smaller than the radius to the top portion of the first crest portion 21 or the second crest portion 22. Therefore, it is possible to perform a process of making the curvatures of predetermined portions (the first valley portion 31 and the second valley portion 32) on the outer peripheral side greater than the curvature of the outermost periphery (the first crest portion 21 and the second crest portion 22).

In addition, the first valley portion 51 and the second valley portion 52 of the lower valley portion 50 are most likely to be deformed on the lower surface of the longitudinal member N1. That is, in the deformation step, not the lower crest portion 40 but vicinities of the bottom portions of the first valley portion 51 and the second valley portion 52 are mainly deformed (compressed). When the above portions (the vicinities of the bottom portions of the first valley portion 51 and the second valley portion 52) are focused on, the radius of curvature of deformation in the deformation step is the radius to the bottom portion of the first valley portion 51 or the second valley portion 52 (distance along the radial direction from point C to the bottom portion of the first valley portion 51 or the second valley portion 52, see a radius R51 illustrated in FIG. 6). That is, the radius of curvature of the deformation is greater than the radius to the top portion of the first crest portion 41 or the second crest portion 42. Therefore, it is possible to perform a process of making the curvatures of predetermined portions (the first valley portion 51 and the second valley portion 52) on the inner peripheral side greater than the curvature of the innermost periphery (the first crest portion 41 and the second crest portion 42).

As described above, in the present embodiment, the difference in curvature between the outer peripheral side and the inner peripheral side can be reduced. Thus, the longitudinal member N1 can be bent easily (with small force), as in the case of bending a thin member (a member having a rectangular shape in front view with a width in the up-down direction shorter than the width W in the up-down direction).

As described above, the longitudinal member N1 (washer 10) according to the present embodiment includes a bimetal material in which the different metallic materials are bonded on the front surface and the rear surface. In this case, the longitudinal member N1 is configured such that the deformation amount (elongation amount and compression amount) with respect to a bending load differs between the front surface and the rear surface. In a case where the longitudinal member N1 as described above is bent, if the upper surface is greatly elongated and the lower surface is greatly compressed, the difference in deformation amount between the upper surface and the lower surface becomes great, and the metallic materials may peel off.

In the present embodiment, since the curvature of the outer peripheral side is increased by the upper valley portions 30, the elongation amount on the outer peripheral side (upper surface) can be reduced. In addition, since the curvature of the inner peripheral side is decreased by the lower valley portions 50, the compression amount on the inner peripheral surface (lower surface) can be reduced. That is, by reducing the difference in the curvature between the outer peripheral side and the inner peripheral side, the difference in the deformation amount between the outer peripheral side and the inner peripheral side can be reduced. Therefore, peeling of the bimetal material can be suppressed.

As described above, the method of manufacturing the washer 10 according to the present embodiment includes the preparation step and the deformation step. The preparation step is a step of preparing the longitudinal member N1 that includes the upper crest portions 20 and the lower crest portions 40 (crest portions) formed on at least one of the upper surface and the lower surface (one side surface and the other side surface in the lateral direction) of the longitudinal member N1, and the upper valley portions 30 and the lower valley portions 50 (valley portions) continuous to the upper crest portions 20 and the lower crest portions 40 in the right-left direction (longitudinal direction), respectively, the upper valley portions 30 and the lower valley portions 50 provided with the projections 33, 53, respectively. The deformation step is a step of deforming the longitudinal member N1 so that the upper surface and the lower surface of the longitudinal member N1 are arcuate as viewed in the direction from the front to the rear (one direction orthogonal to the lateral direction and the longitudinal direction).

With such a configuration, it is possible to prepare the longitudinal member N1 by punching the plate member N substantially linearly. Therefore, the material yield can be improved. In addition, since stress can be dispersed in the first valley portions 31, 51 and the second valley portions 32, 52, the stress on the washer 10 is dispersed to facilitate deformation, and the damage due to deformation can be reduced.

The projections 33, 53 of the longitudinal member N1 prepared in the preparation step are formed on the bottom portions B30, B50 of the upper valley portions 30 and the lower valley portions 50, respectively.

Such a configuration enables stress to be effectively dispersed. Specifically, the bottom portions B30, B50 are the portions on which stress is most likely to be concentrated (most likely to act) in the upper valley portion 30 and the lower valley portion 50 in a case where the projections 33, 53 are not formed. By forming the projections 33, 53 on the bottom portions B30, B50 as described above, it is possible to disperse the stress acting on the portions on which the stress is most likely to be concentrated in the first valley portions 31, 51 and the second valley portions 32, 52. Therefore, it is possible to effectively disperse the stress.

In addition, the upper valley portion 30 and the lower valley portion 50 of the longitudinal member N1 prepared in the preparation step are formed such that the first valley portions 31, 51 and the second valley portions 32, 52 (portions adjacent to the projections 33, 53 in the longitudinal direction) have an arc shape as viewed in the direction from the front to the rear.

With such a configuration, stress can be dispersed in a well-balanced manner in the first valley portions 31, 51 and the second valley portions 32, 52.

The projections 33, 53 of the longitudinal member N1 prepared in the preparation step are formed such that the tip portions of the projections 33, 53 have an arc shape as viewed in the direction from the front to the rear.

With such a configuration, stress can be dispersed in a well-balanced manner in the tip portions of the projections 33, 53.

The recesses 23, 43 are formed in the upper crest portion 20 and the lower crest portion 40 of the longitudinal member N1 prepared in the preparation step, respectively.

Such a configuration enables stress to be dispersed in the recesses 23, 43. Thus, since stress can be dispersed in a great number of portions, the stress on the washer 10 is dispersed to facilitate deformation, and damage due to the deformation can be reduced.

The recesses 23, 43 of the longitudinal member N1 prepared in the preparation step are formed such that the tip portions of the recesses 23, 43 have an arc shape as viewed in the direction from the front to the rear.

With such a configuration, stress can be dispersed in a well-balanced manner in the tip portions of the recesses 23, 43.

In addition, the plurality of upper crest portions 20 and the plurality of upper valley portions 30, and the plurality of lower crest portions 40 and the plurality of lower valley portions 50 are alternately and continuously formed from the left end (one end in the longitudinal direction) to the right end (the other end) on at least one of the upper surface and the lower surface of the longitudinal member N1 prepared in the preparation step.

With such a configuration, it is possible to include a great number of upper valley portions 30 and lower valley portions 50. Therefore, stress can be dispersed in a great number of portions. Accordingly, the number of upper crest portions 20 and lower crest portions 40 increases. Therefore, the influence of the decrease in the areas of the front surface and the rear surface due to an increase in the number of upper valley portions 30 and lower valley portions 50 is reduced. As described above, it is possible to disperse stress on the washer 10 so as to facilitate deformation and reduce damage due to the deformation while suppressing reduction in sliding area.

In addition, in the present embodiment, by forming the upper crest portions 20 and the lower crest portions 40 where the recesses 23, 43 are formed from the left end to the right end, it is possible to further increase the number of portions where the stress is dispersed. Thus, it is possible to disperse stress on the washer 10 so as to facilitate deformation, and to reduce damage due to the deformation.

In addition, in the deformation step, the longitudinal member N1 is deformed so that the upper crest portions 20 and the upper valley portions 30, or the lower crest portions 40 and the lower valley portions 50 are disposed at least on the outer peripheral side.

With such a configuration, it is possible to hold a great amount of lubricant by elongating the valley portion (the upper valley portion 30) in the deformation step (widening the valley portion along the circumferential direction). Therefore, lubricity can be improved.

In addition, the upper surface and the lower surface of the longitudinal member N1 prepared in the preparation step are formed such that the width W in the up-down direction (distance along the lateral direction from the one side surface to the other side surface) is constant from the left end to the right end.

With such a configuration, it is possible to prevent formation of a portion where the width W in the up-down direction is locally narrow in the longitudinal member N1 and to keep the upper valley portion 30 and the lower valley portion 50 where stress is likely to act away from each other. Therefore, it is possible to cover a wider range with the narrow width W in the up-down direction (slide on the shaft member with a width wider than the width W in the up-down direction). Specifically, in the washer 10, the upper crest portion 20 is disposed so as to protrude to the outer peripheral side, and the lower crest portion 40 is disposed so as to protrude toward the inner peripheral side. The upper crest portion 20 and the lower crest portion 40 described above make the width from the outermost periphery to the innermost periphery of the washer 10 along the radial direction wider than the width W in the up-down direction. Therefore, the washer 10 can slide on a further outer peripheral side with respect to the shaft member due to formation of the upper crest portion 20, and the washer 10 can slide on a further inner peripheral side with respect to the shaft member due to formation of the lower crest portion 40. Therefore, the washer 10 can slide on the shaft member with a width greater than the width W in the up-down direction of the longitudinal member N1.

The longitudinal member N1 prepared in the preparation step includes a bimetal material made of a plurality of different metallic materials.

Such a configuration enables suppression of peeling of the metallic materials. Specifically, if the difference in deformation amount between the upper surface and the lower surface of the bimetal material is great, the metallic materials may peel off. Since the longitudinal member N1 according to the present embodiment includes the upper valley portions 30 and the lower valley portions 50, the difference in the curvature between the upper surface and the lower surface is reduced, and the difference in the deformation amount between the upper surface and the lower surface is reduced. Therefore, peeling of the metallic materials can be suppressed.

In addition, the washer 10 according to the present embodiment includes the upper crest portions 20 and the lower crest portions 40 formed on at least one of the outer peripheral surface and the inner peripheral surface of the washer 10, and the upper valley portions 30 and the lower valley portions 50 continuous to the upper crest portions 20 and the lower crest portions 40 in the circumferential direction, respectively, the upper valley portions 30 and the lower valley portions 50 provided with the projections 33, 53, respectively.

With such a configuration, it is possible to form the washer 10 from the longitudinal member N1 prepared by punching the plate member N substantially linearly. Therefore, the material yield can be improved.

Note that the upper crest portion 20 and the lower crest portion 40 according to the present embodiment are an embodiment of a crest portion according to the present invention. The upper valley portion 30 and the lower valley portion 50 according to the present embodiment are an embodiment of a valley portion according to the present invention.

The first valley portions 31, 51 and the second valley portions 32, 52 according to the present embodiment are an embodiment of a portion adjacent to a projection in a longitudinal direction according to the present invention.

The upper surface of the longitudinal member N1 according to the present embodiment is an embodiment of one side surface of a longitudinal member according to the present invention.

The lower surface of the longitudinal member N1 according to the present embodiment is an embodiment of another side surface of the longitudinal member according to the present invention.

The up-down direction in the present embodiment corresponds to a lateral direction according to the present invention.

The right-left direction in the present embodiment corresponds to the longitudinal direction according to the present invention.

The direction from the front to the rear in the present embodiment corresponds to one direction according to the present invention.

The embodiment of the present invention has been described above; however, the present invention is not limited to the above configuration, and various modifications can be made within the scope described in the claims.

For example, the washer 10 is formed in a semicircular shape in front view; however, the shape of the washer according to the present invention is not limited to this. The washer according to the present invention may have an arcuate shape in front view with a central angle of 90° or 60°.

In the preparation step according to the present embodiment, the plate member N is punched such that the left end portion and the right end portion of the plate member N are not scrapped; however, the present invention is not limited to this. That is, in the preparation step according to the present invention, for example, the plate member N may be punched such that the left end portion and the right end portion of the plate member N are scrapped as required in terms of manufacture or design of the washer 10.

In the longitudinal member N1 according to the present embodiment, the crest portion and the valley portion are formed on the upper surface and the lower surface. However, in the longitudinal member according to the present invention, the crest portion and the valley portion may be formed on at least one of the upper surface and the lower surface.

In the deformation step according to the present embodiment, the right portion and the left portion of the longitudinal member N1 are bent downward. However, in a deformation step according to the present invention, the direction in which the longitudinal member N1 is bent is not limited to a downward direction of the longitudinal member N1 and may be an upward direction of the longitudinal member N1. Such a bending direction is determined according to, for example, the number of crest portions and valley portions, or the like. In a case where the longitudinal member N1 is bent upward, stress can be dispersed in the first valley portions 31, 51 and the second valley portions 32, 52 as in the present embodiment. Note that in this case, the upper surface of the longitudinal member N1 is compressed in the circumferential direction of the washer 10. In addition, the lower surface of the longitudinal member N1 is elongated in the circumferential direction of the washer 10. That is, in this case, the surface to be elongated and the surface to be compressed in the deformation step are reversed from those in the present embodiment.

The upper crest portions 20 and the upper valley portions 30, and the lower crest portions 40 and the lower valley portions 50 according to the present embodiment are formed to extend from the left end to the right end of the longitudinal member N1. However, the range in which the crest portions and the valley portions according to the present invention are formed is not limited to this. The crest portion and the valley portion according to the present invention may be formed only at a central portion in the right-left direction of the longitudinal member N1. In such a case, the portion of the longitudinal member N1 excluding the central portion in the right-left direction may be formed into a flat shape.

In addition, the projections 33, 53 according to the present embodiment are formed on the bottom portions B30, B50 of the upper valley portion 30 and the lower valley portion 50 (protrude from the bottom portions B30, B50), respectively. However, locations where the projections according to the present invention are formed are not limited to the bottom portions B30, B50. That is, the projections may be formed on portions other than the bottom portions B30, B50 (locations shifted to the right or the left from the bottom portions B30, B50). For example, the projections may be formed on the left sides of the bottom portions B30, B50, or may be formed on the right end portions of the upper valley portion 30 and the lower valley portion 50.

The recesses 23, 43 according to the present embodiment are formed on the top portions T20, T40 of the upper crest portion 20 and the lower crest portion 40, respectively (the top portions T20, T40 are formed to be recessed). However, locations where the recesses according to the present invention are formed are not limited to the top portions T20, T40. That is, the recesses may be formed on portions other than the top portions T20, T40 (locations shifted to the right or the left from the top portions T20, T40). For example, the recesses may be formed on the left sides of the top portions T20, T40, or may be formed on the right end portions of the upper crest portion 20 and the lower crest portion 40.

In the present embodiment, one projection (the projection 33, 53) is formed in one valley portion (the upper valley portion 30, the lower valley portion 50). However, the number of projections formed in the valley portion according to the present invention is not limited to this, and a plurality of projections may be formed in one valley portion.

In the present embodiment, one recess (the recess 23, 43) is formed in one crest portion (the upper crest portion 20, the lower crest portion 40). However, the number of recesses formed in the crest portion according to the present invention is not limited to this, and a plurality of recesses may be formed in one crest portion.

In the present embodiment, the lower valley portion 50 is disposed below the upper crest portion 20 and the lower crest portion 40 is disposed below the upper valley portion 30. However, the positional relationship between the crest portion and the valley portion according to the present invention is not limited to this. For example, the crest portion and the valley portion according to the present invention may be disposed similarly to those in a longitudinal member N101 according to a first modification illustrated in FIGS. 7(a) and 7(b) where a lower crest portion 140 is disposed below an upper crest portion 120 and a lower valley portion 150 is disposed below an upper valley portion 130. Thus, the longitudinal member N101 can be bent with a smaller force than in the case of bending the longitudinal member N1 according to the present embodiment.

Figure 8A:
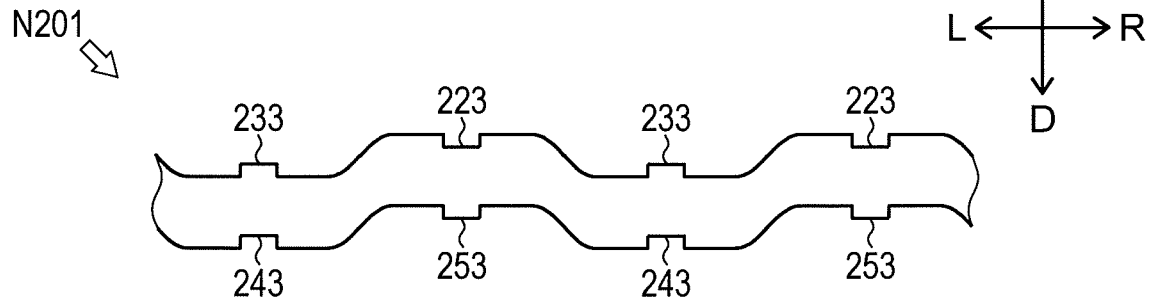
FIG. 8(a) is an enlarged front view illustrating a longitudinal member according to a second modification.

The recesses 23, 43 and the projections 33, 53 according to the present embodiment are formed such that the tip portion of each of the recesses 23, 43 and the projections 33, 53 is formed into a substantially arc shape in front view. However, the shapes of the recess and the projection according to the present invention is not limited to this. The recess and the projection according to the present invention may have substantially rectangular shapes in front view similarly to recesses 223, 243 and projections 233, 253 of a longitudinal member N201 according to a second modification illustrated in FIG. 8(a).

Figure 8B:
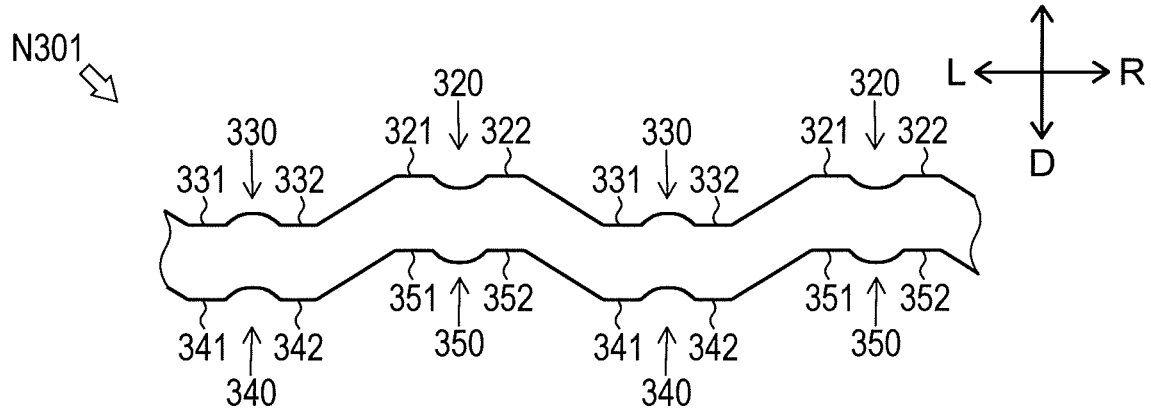
FIG. 8(b) is an enlarged front view illustrating a longitudinal member according to a third modification.

The shapes of the first crest portions 21, 41 and the second crest portions 22, 42 are not limited to the substantially arc shape in front view as in the present embodiment. For example, the first crest portion and the second crest portion may have a shape with a linear top portion similarly to first crest portions 321, 341 and second crest portions 322, 342 of a longitudinal member N301 according to a third modification illustrated in FIG. 8(b).

The shapes of the first valley portions 31, 51 and the second valley portions 32, 52 are not limited to the substantially arc shape in front view as in the present embodiment. For example, the first valley portion and the second valley portion may have a shape with a linear bottom portion similarly to first valley portions 331, 351 and second valley portions 332, 352 according to the third modification illustrated in FIG. 8(b).

Figure 8C:
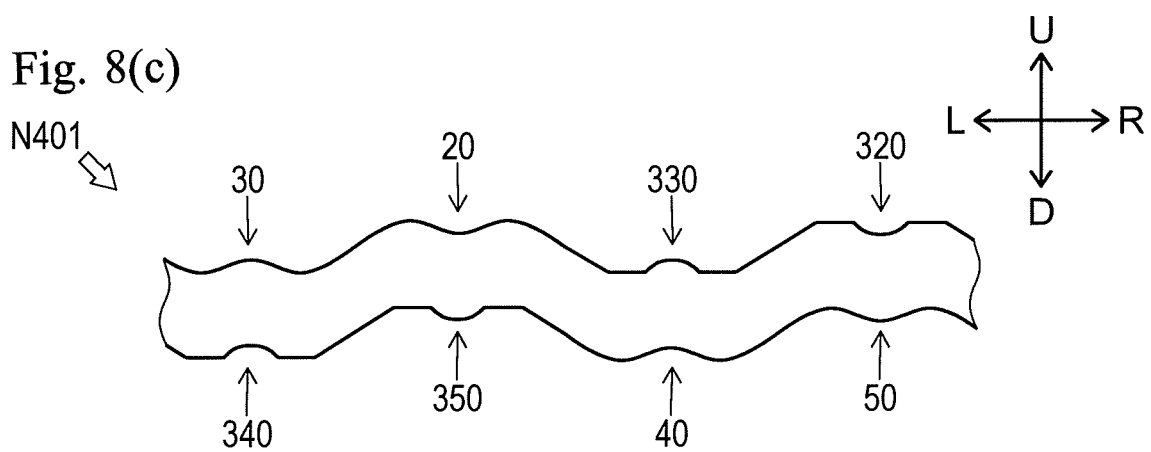
FIG. 8(c) is an enlarged front view illustrating a longitudinal member according to a fourth modification.

The plurality of upper crest portions 20 (the plurality of lower crest portions 40) according to the present embodiment have substantially identical shapes; however, the plurality of crest portions according to the present invention may have different shapes. For example, the plurality of crest portions according to the present invention may be configured similarly to crest portions of a longitudinal member N401 according to a fourth modification illustrated in FIG. 8(c). Upper crest portions according to the fourth modification are configured of the upper crest portion 20 according to the present embodiment and an upper crest portion 320 according to the third modification. Lower crest portions according to the fourth modification are configured of the lower crest portion 40 according to the present embodiment and a lower crest portion 340 according to the third modification.

The plurality of upper valley portions 30 (the plurality of lower valley portions 50) according to the present embodiment have identical shapes; however, the plurality of valley portions according to the present invention may have different shapes. For example, the plurality of valley portions according to the present invention may be configured similarly to valley portions of the longitudinal member N401 according to the fourth modification illustrated in FIG. 8(c). The upper valley portions according to the fourth modification are configured of the upper valley portion 30 according to the present embodiment and an upper valley portion 330 according to the third modification. The lower valley portions according to the fourth modification are configured of the lower valley portion 50 according to the present embodiment and a lower valley portion 350 according to the third modification.

The recesses 23, 43 are formed in the upper crest portion 20 and the lower crest portion 40 according to the present embodiment, respectively. However, the crest portions according to the present invention are not limited to the upper crest portion 20 and the lower crest portion 40 described above, and the crest portions may not be provided with the recesses 23, 43.

The longitudinal member N1 according to the present embodiment includes a bimetal material formed by bonding two kinds of metallic materials together; however, the number of kinds of metallic materials of a bimetal material according to the present invention is not limited to this. The bimetal material according to the present invention may be obtained by bonding three or more kinds of metallic materials. The material which constitutes the longitudinal member N1 according to the present invention is not limited to a bimetal material, and may include an appropriate (one kind of) metallic material or the like.

INDUSTRIAL APPLICABILITY

The present invention can be applied to a method of manufacturing a washer for receiving a load and a washer.

REFERENCE SIGNS LIST

10: Washer
20: Upper crest portion (Crest portion)
30: Upper valley portion (Valley portion)
33: Projection
40: Lower crest portion (Crest portion)
50: Lower valley portion (Valley portion)
53: Projection
N1: Longitudinal member

The invention claimed is:

1. A method of manufacturing a washer comprising:
obtaining a longitudinal member having one side surface and another side surface separated from each other along a lateral direction of the longitudinal member; the longitudinal member includes a crest portion and a valley portion continuous to the crest portion in a longitudinal direction, wherein the crest portion and the valley portion are on at least one of the one side surface and the another side surface; the valley portion is a recess extending inwardly in the lateral direction, the valley portion provided with a projection protruding outwardly in the lateral direction from a depression in the valley portion; and a recess extends inwardly in a top portion of the crest portion of the longitudinal member; and
deforming the longitudinal member such that the one side surface and the other side surface are arcuate as viewed in one direction orthogonal to the lateral direction and to the longitudinal direction.

2. The method of manufacturing a washer according to claim 1, wherein
the projection of the longitudinal member is such that a tip portion of the projection has an arc shape as viewed in the one direction.

3. The method of manufacturing a washer according to claim 1, wherein
the recess of the longitudinal member is such that a tip portion of the recess has an arc shape as viewed in the one direction.

4. The method of manufacturing a washer according to claim 1, wherein
a plurality of the crest portions and a plurality of the valley portions are alternately and continuously formed from one end to another end in the longitudinal direction on at least one of the one side surface and the other side surface of the longitudinal member.

5. The method of manufacturing a washer according to claim 1, wherein
in the deformation step, the longitudinal member is deformed so that the crest portion and the valley portion are disposed at least on an outer peripheral side.

6. The method of manufacturing a washer according to claim 1, wherein
the one side surface and the other side surface of the longitudinal are formed such that a distance along the lateral direction from the one side surface to the other side surface is constant from one end to another end of the longitudinal member in the longitudinal direction.

7. The method of manufacturing a washer according to claim 1, wherein
the longitudinal member includes a bimetal material made of a plurality of different metallic materials.

8. The method of manufacturing a washer according to claim 1, wherein the obtaining step is a step of forming the longitudinal member to include the crest portion formed on at least one of one side surface and another side surface of the longitudinal member in the lateral direction.

9. The method of manufacturing a washer according to claim 1, wherein
the projection of the longitudinal member is at a bottom portion of the valley portion.

10. The method of manufacturing a washer according to claim 9, wherein
the projection of the longitudinal member is formed such that a tip portion of the projection has an arc shape as viewed in the one direction.

11. The method of manufacturing a washer according to claim 9, wherein
the valley portion of the longitudinal member is such that a portion of the valley portion adjacent to the projection in the longitudinal direction has an arc shape as viewed in the one direction.

12. The method of manufacturing a washer according to claim 11, wherein
the projection of the longitudinal member is such that a tip portion of the projection has an arc shape as viewed in the one direction.

13. The method of manufacturing a washer according to claim 1, wherein
the valley portion of the longitudinal member is such that a portion of the valley portion adjacent to the projection in the longitudinal direction has an arc shape as viewed in the one direction.

14. The method of manufacturing a washer according to claim 13, wherein
the projection of the longitudinal member is such that a tip portion of the projection has an arc shape as viewed in the one direction.

15. A washer comprising:
a washer body;
at least one of:
a first crest portion on the washer body which is formed on an outer peripheral surface of the washer and protrudes outwardly in a radial direction, and a first valley portion on the washer body which is continuous to the first crest portion in a circumferential direction, and the first valley portion is provided with a first projection, the first valley portion is recessed inwardly in the radial direction, and the first projection protrudes outwardly in the radial direction from a first depression in the first valley portion; and
a second crest portion on the washer body which is formed on an inner peripheral surface of the washer and protrudes inwardly in the radial direction, and a second valley portion on the washer body which is continuous to the second crest portion in the circumferential direction and the second valley portion is provided with a second projection, the second valley portion is recessed outwardly in the radial direction, and the second projection protrudes inwardly in the radial direction from a second depression in the second valley portion.

* * * * *